(12) United States Patent
Qiu

(10) Patent No.: US 7,425,374 B2
(45) Date of Patent: Sep. 16, 2008

(54) FLUORINATED SURFACTANTS

(75) Inventor: Zai-Ming Qiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 474 days.

(21) Appl. No.: 11/275,296

(22) Filed: Dec. 22, 2005

(65) Prior Publication Data

US 2007/0149662 A1 Jun. 28, 2007

(51) Int. Cl.
C08K 5/435 (2006.01)
C07C 303/36 (2006.01)
B32B 27/00 (2006.01)
B05D 3/00 (2006.01)

(52) U.S. Cl. .................. 428/500; 564/96; 524/168; 427/388.4

(58) Field of Classification Search ................ 524/168; 564/96; 428/411.1
See application file for complete search history.

(56) References Cited

U.S. PATENT DOCUMENTS

| | | | |
|---|---|---|---|
| 2,519,983 A | | 8/1950 | Simons |
| 4,265,831 A | * | 5/1981 | Mitschke et al. .............. 564/96 |
| 4,321,404 A | | 3/1982 | Williams et al. |
| 4,359,096 A | | 11/1982 | Berger |
| 4,484,990 A | | 11/1984 | Bultman et al. |
| 4,533,713 A | | 8/1985 | Howells |
| 4,830,910 A | | 5/1989 | Larson |
| 5,207,996 A | | 5/1993 | Sierakowski et al. |
| 6,380,289 B1 | * | 4/2002 | Thompson et al. .......... 524/198 |
| 6,485,789 B1 | * | 11/2002 | Allewaert et al. ........ 427/393.4 |
| 6,664,354 B2 | | 12/2003 | Savu et al. |
| 6,890,452 B2 | | 5/2005 | Parent et al. |
| 2003/0139549 A1 | | 7/2003 | Savu et al. |
| 2003/0236340 A1 | | 12/2003 | Kubicek et al. |
| 2005/0181620 A1 | | 8/2005 | Parent et al. |
| 2005/0197273 A1 | | 9/2005 | Savu et al. |

FOREIGN PATENT DOCUMENTS

JP 2001-278973 * 10/2001

OTHER PUBLICATIONS

Machine translation of JP 2001-278973.*
Moore et al., "Compositions of Fluorochemical Surfactants", U.S. Appl. No. 11/215,077, filed Aug. 30, 2005.
Savu et al., "Coatable Composition", U.S. Appl. No. 11/275,269, filed Dec. 21, 2005.
Kissa, "Fluorinated Surfactants—Synthesis-Properties-Applications, Chapter 8 Applications", Marcel Dekker, Inc., New York, 1994, pp. 325-327, 343.
Sievert, "Preparation and Characterisation of Buffered Oxide Etchants", Semiconductor Fabtech—8th Ed., ICG Publishing, date believed to be 1998, pp. 135-138.
Overdiep, "The Levelling of Paints", Progress in Organic Coatings, 1986, vol. 14, pp. 159-175.
Weidner et al., "Role of Surface Tension Gradients in Correcting Coating Defects in Corners", Journal of Colloid and Interface Science, 1996, vol. 179, pp. 66-75.
R.E. Banks, Editor, Abe et al., "Preparation, Properties, and Industrial Applications of Organofluorine Compounds", Ellis Horwood Ltd., John Wiley & Sons, 1982, Chapter 1, pp. 19-43.
Tarant, Editor, Nagase, "Fluorine Chemistry Reviews", vol. 1, Marcel Dekker, Inc., New York, 1967, pp. 77-106.

* cited by examiner

Primary Examiner—D. Lawrence Tarazano
Assistant Examiner—John Uselding
(74) Attorney, Agent, or Firm—Bradford B. Wright; Julie A. Lapos-Kuchar

(57) ABSTRACT

A composition comprising a fluorinated surfactant. Also, an unseparated reaction product obtained by reacting an epoxide and either an acid alcohol or an acid mercaptan. Additionally, a coatable composition comprising a leveling agent, water, and a film-forming organic polymer. The present application also provides a method of coating and a coated article.

17 Claims, No Drawings

FLUORINATED SURFACTANTS

BACKGROUND

Numerous industrial and natural processes involve the flow of thin liquid films. Common applications include liquid paints, floor wax, and wood sealants. In many of these applications, it is desirable to have a uniform (level) coating. Freshly applied liquid films, however, normally have uneven surfaces. These uneven surfaces, along with the dynamics of film drying, can produce coating defects such as orange peel or cratering (i.e., formation of surface blemishes, usually in the form of small round patches).

There is wide industrial interest in reducing and eliminating coating defects. Despite the interest in reducing coating defects, however, finding particular additives that are capable of serving as leveling agents remains an empirical exercise. In general, while some leveling agents are surfactants, the ability of any particular surfactant to lower the surface tension of a solvent or formulation has proven to have little predictive value in determining whether that surfactant would be useful as a leveling agent to reduce coating defects.

SUMMARY

In one aspect, the present invention provides a coatable composition comprising water, a film-forming organic polymer, and a leveling agent. The leveling agent is represented by Formula (I) (below):

$$R_f-SO_2-N(R)-CH_2CH(OX')CH_2-Q-X \quad (I)$$

In formula (I), $R_f$ is selected from the group consisting of $C_2$ to $C_6$ perfluoroalkyl groups. R is selected from the group consisting of H and a $C_1$ to $C_{18}$ alkyl group. Each Q is independently selected from the group consisting of O and S. X is selected from the group consisting of —(C(=O)—(CH$_2$)$_a$-Q)$_b$-M, —((CH$_2$)$_a$—C(=O)-Q)$_b$-M, and —(C(=O)—(CH$_2$)$_a$-Q)$_b$—CH$_2$CH(OX')—CH$_2$N(R)SO$_2$R$_f$, wherein M is selected from the group consisting of H and a cation, each a is independently selected from 1 to 5, and each b is independently selected from 1 to 4. X' is selected from the group consisting of H and X.

In some embodiments, the coatable compositions further comprise wax or pigment.

In another aspect, the present invention relates to a method of coating comprising applying a composition to a substrate, the composition comprising water, a film-forming organic polymer, and a leveling agent represented by Formula (I).

In yet another aspect, the present invention relates to a coated article comprising a substrate and a coating. The coating comprises water, a film-forming organic polymer, and a leveling agent represented by Formula (I).

In a further aspect, the present invention relates to a composition comprising the unseparated reaction product obtained by reacting:

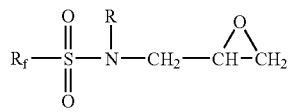

with

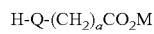

$$H-Q-(CH_2)_a CO_2 M$$

wherein: $R_f$, R, Q, M, and a are as defined hereinabove.

In another aspect, the present invention relates to a composition comprising $R_f$—SO$_2$—N(R)—CH$_2$CH(OX')CH$_2$-Q-X wherein: $R_f$, R, X, X', and Q are as defined hereinabove, with the proviso that when X is —((CH$_2$)$_a$—C(=O)-Q)$_b$-M, each b is independently selected from 2 to 4.

Coatable compositions according to the present description exhibit desirable leveling behavior that typically results, upon coating on a substrate and drying, in dried coatings with an aesthetically pleasing appearance.

In this application, all numerical ranges (for example, 2 to 6 carbon atoms) shall be considered to include their endpoints unless explicitly stated otherwise. Also, the term "film-forming organic polymer" refers to a waterborne organic polymer that will uniformly coalesce upon drying.

DETAILED DESCRIPTION

Coatable compositions according to the present description comprise water, a film-forming organic polymer, and a leveling agent.

While coatable compositions according to the present invention may have the film-forming organic polymer dissolved or dispersed solely in water, water-soluble organic solvents may optionally be combined with the water, for example, to facilitate uniform drying and or film-formation.

Examples of water-soluble organic solvents include alcohols containing 1 to 4 carbon atoms such as methanol, ethanol, isopropanol, and isobutanol; amides and lactams such as N,N-dimethylformamide, N,N-dimethylacetamide, and N-methylpyrrolidone; ketones and ketoalcohols such as acetone, cyclohexanone, methyl isobutyl ketone, and diacetone alcohol; ethers such as tetrahydrofuran, dioxane, and lower alkyl ethers of polyhydric alcohol such as glycol monomethyl (or monoethyl) ether; alkylene glycols and polyalkylene glycols such as ethylene glycol, propylene glycol, butylene glycol, triethylene glycol, hexylene glycol, diethylene glycol, diethylene glycol monoethyl ether, polyethylene glycol, polypropylene glycol, dipropylene glycol monomethyl ether; 1,3-dimethyl-2-imidazolidinone; and combinations thereof.

Typically, the amount of water and optional water-soluble organic solvent in the coatable compositions will be in a range of from 40 to 99 percent by weight, based on the total weight of the coatable composition, however, other amounts may also be used.

Film-forming polymers suitable for use in the compositions are generally thermoplastic organic polymers containing carbon and hydrogen and optionally oxygen, nitrogen and/or halogen. Examples of suitable polymers include: polyesters, for example, polyethylene terephthalate or polycaprolactone; copolyesters, for example, polyethylene terephthalate isophthalate; polyamides, for example, polyhexamethylene adipamide; vinyl polymers, for example, poly(vinyl acetate/methyl acrylate), poly(vinylidene chloride/vinyl acetate); polyolefins, for example, polystyrene and copolymers of styrene with acrylate(s) such as, for example, poly(styrene-co-butyl acrylate); polydienes, for example, poly(butadiene/styrene); acrylic polymers, for example, poly(methyl methacrylate-co-ethyl acrylate), poly(methyl acrylate-co-acrylic acid); polyurethanes, for example, reaction products of aliphatic, cycloaliphatic or aromatic diisocyanates with polyester glycols or polyether glycols; and cellulosic derivatives, for example, cellulose ethers such as ethyl cellulose and cellulose esters such as cellulose acetate/butyrate. Combinations of film-forming polymers may also be used. Methods and materials for preparing aqueous emulsions or latexes of such polymers are well known, and many are widely available from commercial sources.

One or more film-forming polymers may be present, for example, as an emulsion or latex. Typically the amount of film-forming polymer(s) is in a range of from 1 to 40 percent by weight, based on the total weight of the coatable composition, however other amounts may also be used.

In addition to the optional organic solvent, coatable compositions according to the present invention may also include one or more plasticizers, coating aids, anti-foaming agents, polymer emulsions, cross-linking agents, waxes, pigments, light stabilizers, inorganic fillers, or a combination thereof.

The leveling agent is represented by Formula (I):

$$R_f\!-\!SO_2\!-\!N(R)\!-\!CH_2CH(OX')CH_2\!-\!Q\!-\!X \qquad (I)$$

wherein:

$R_f$ is selected from the group consisting of $C_2$ to $C_6$ perfluoroalkyl groups. These groups may be branched or unbranched.

R is selected from the group consisting of H and a $C_1$ to $C_{18}$ alkyl group. These groups may be branched or unbranched, and may be cyclic or acyclic. Cyclic groups may be substituted by either alkyl or alkylene groups. Examples include methyl, ethyl, isobutyl, isooctyl, dodecyl, and octadecyl. In some embodiments R may have up to 8 carbon atoms, or even up to three carbon atoms. In some embodiments, R is methyl, ethyl, or propyl.

X is selected from the group consisting of $-\!(C(\!=\!O)\!-\!(CH_2)_a\!-\!Q)_b\!-\!M$, $-\!((CH_2)_a\!-\!C(\!=\!O)\!-\!Q)_b\!-\!M$, and $-\!(C(\!=\!O)\!-\!(CH_2)_a\!-\!Q)_b\!-\!CH_2CH(OX')\!-\!CH_2N(R)SO_2R_f$. M is selected from the group consisting of H and a cation. When M is a cation, the Q closest to M bears a negative charge. M balances the overall charge of the composition. Examples of suitable cations include: inorganic cations such as alkali metal cations (e.g., $Li^+$, $Na^+$, $K^+$), alkaline earth metal cations transition metal cations, and $NH_4^+$; and organic cations such as onium ions including primary, secondary, tertiary, or quaternary ammonium cations, sulfonium ions, and phosphonium ions.

Each a is independently selected from 1 to 5, and each b is independently selected from 1 to 4. X' is selected from the group consisting of H and X. In order to vary a, one may, for instance, react a different acid alcohol with an epoxide. On the other hand, b may vary depending upon how many moles of the acid alcohol react with the epoxide. Without wishing to be bound by theory, it is believed that a reaction between an acid alcohol and epoxide proceeds as shown in Scheme I.

SCHEME I

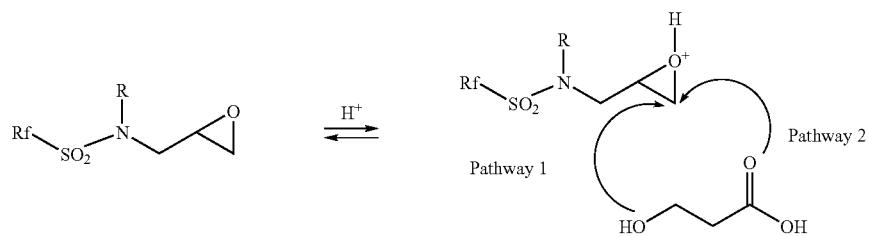

As indicated, the acid catalyzed epoxide opening may proceed through nucleophilic attack by either the alcohol oxygen (or mercaptan S, when a mercaptan is used), or a carboxylic acid oxygen. In the embodiment shown above, when the acid alcohol reacts by nucleophilic attack of the alcohol oxygen (Pathway 1), the resulting product is:

$R_f\!-\!SO_2N(R)CH_2CH(OX')CH_2O(CH_2)_2CO_2H$

This is the so-called "ether linkage" product. On the other hand, in the embodiment shown above, when the acid alcohol reacts by nucleophilic attack of a carboxylic acid oxygen (Pathway 2), the resulting product is:

$R_f\!-\!SO_2N(R)CH_2CH(OX')CH_2OC(\!=\!O)(CH_2)_2OH$

This is the so-called "ester linkage" product.

Whether "ester linkage" or "ether linkage", the resulting product may be protonated by the acid catalyst and undergo a second nucleophilic displacement reaction. This second reaction produces a leveling agent with a corresponding b value of 2. Further addition reactions are possible, increasing the value of b. One having ordinary skill in the art will recognize that reaction conditions such as time of reaction, reaction temperature, acid strength, relative concentration of reactants, and even order and/or rate of addition of reactants, can play a role in determining the value of b. An example of a second nucleophilic displacement reaction is illustrated for the ester linkage in Scheme II.

SCHEME II

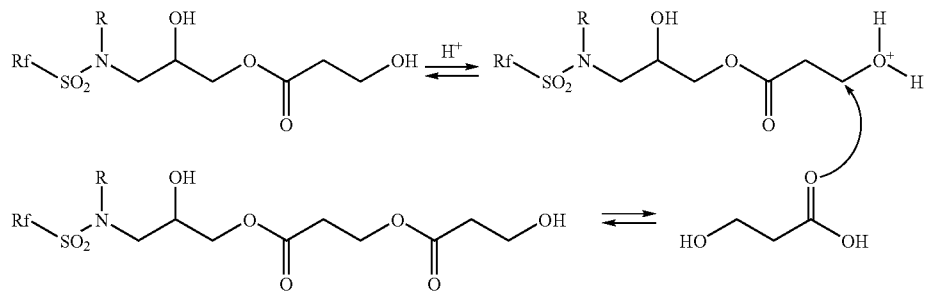

Again, without wishing to be bound by theory, it is believed that a similar nucleophilic attack displacing water may take place between the acid alcohol and the alcohol group in the position β to the first ether linkage. Furthermore, a similar nucleophilic displacement reaction may take place between the acid alcohol and the carboxylic acid end-group in forming the ether linkage.

Typically, the amount of leveling agent in the coatable composition will be in a range of from 0.1 parts per million by weight to 1 percent by weight. In some embodiments, the leveling agent may be present from a level of at least 0.5, 5, 10, or 20 parts per million or more. In other embodiments, the leveling agent may be present in an amount of up to 5, up to 10, up to 100, or even up to 1000 parts per million.

In some embodiments, such as those wherein the coatable composition further comprises a wax, the coatable compositions may be used to provide buffable finishes suitable for use as a floor finish or as a motor vehicle or marine finish. In such embodiments, the film-forming polymer typically has at least one, more typically a plurality, of pendant cross-linkable groups (e.g., —$CO_2H$ or —$CO_2^-$, —$NH_2$, and/or —$CH_2OH$), and one or more metal complexing agents (e.g., $Zn^{2+}$, $Ca^{2+}$, $Ti^{4+}$), present, for instance, as an amine.

In some embodiments, the coatable composition may further comprise a cross-linking agent for the organic polymer. Examples include polyvalent metal cations such as those metal complexing agents listed above as well as $Mg^{2+}$, $Zr^{4+}$, and $Al^{3+}$ cations, borates, polyalkoxysilanes, and polyaziridines.

In some embodiments, the coatable composition may comprise one or more colorants such as dyes or pigments. Such coatable compositions may be used as paint.

In another aspect, the present invention relates to the unseparated reaction product obtained by reacting:

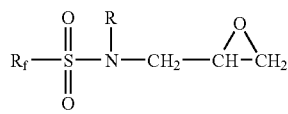

with

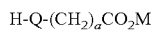

wherein: $R_f$, R, Q, M, and a are as defined hereinabove.

By "unseparated reaction product" is meant all reaction products including the ether linkage and/or ester linkage organic compounds as described above and as indicated in the examples, that result from the reaction of the epoxy compound and the acid alcohol (or mercaptan), before they are subjected to any further steps to separate reaction products from one another. For instance, when the epoxy compound has $R_f=C_4F_9$, and $R=CH_3$; and the acid compound is an acid alcohol wherein a equals 1 and M is H, the "unseparated reaction product" includes the following, as determined by $^1H$ and $^{13}C$ NMR: $C_4F_9SO_2N(CH_3)CH_2CH(OH)CH_2O$—[C(=O)$CH_2O]_n$—H wherein n is 1 or 2; $C_4F_9SO_2N(CH_3)$ $CH_2CH(O$—[C(=O)$CH_2O]_m$—H)$CH_2O$—[C(=O)$CH_2O]_n$—H wherein n is 0 to 4 and m is 1 to 4; $C_4F_9SO_2N(CH_3)CH_2CH(OH)CH_2O$—[$CH_2CO_2]_n$—H wherein n is 1 to 4; and $C_4F_9SO_2N(CH_3)CH_2CH(O$—[C(=O)$CH_2O]_m$—H) $CH_2O$—[$CH_2CO_2]_n$—H wherein each n and m is independently 1 to 4.

The coatable compositions described herein may be coated onto a substrate. Thus, in another aspect, the present invention relates to applying to a substrate a composition comprising water, a film-forming organic polymer, and a leveling agent. The leveling agent is represented by the formula $R_f$—$SO_2$—N(R)—$CH_2CH(OX')CH_2$-Q-X, wherein: $R_f$, R, Q, X, and X' are as defined hereinabove.

The step of applying may be by any suitable method such as brushing, mopping, bar coating, spraying, dip coating, gravure coating, and roll coating.

In yet another aspect, the present invention relates to a coated article comprising a substrate and a coating. The coating comprises water, a film-forming organic polymer, and a leveling agent. The leveling agent is represented by the formula $R_f$—$SO_2$—N(R)—$CH_2CH(OX')CH_2$-Q-X, wherein: $R_f$, R, Q, X, and X' are as defined hereinabove.

Suitable substrates include wood, glass, metal, ceramics, organic and inorganic polymers, plaster, drywall, rock, concrete, and asphalt.

In yet another aspect, the present invention relates to a composition comprising $R_f$—$SO_2$—N(R)—$CH_2CH(OX')$ $CH_2$-Q-X, wherein: $R_f$, R, Q, X, and X' are as defined hereinabove, with the proviso that when X is —(($CH_2)_a$—C(=O)-Q)$_b$-M, each b is independently selected from 2 to 4. That is, when the composition is the so-called "ether linkage", the composition comprises two to four —(($CH_2)_a$—C(=O)-Q)$_b$-groups.

Objects and advantages of the invention are further illustrated by the following examples, but the particular materials and amounts thereof recited in these examples, as well as other conditions and details, should not be construed to unduly limit the invention.

EXAMPLES

Unless otherwise noted, all parts, percentages, and ratios in the examples and the rest of the specification are by weight, and all solvents and reagents used in the examples were obtained, or are available, from general chemical suppliers such as Sigma-Aldrich Company, Saint Louis, Mo., or may be synthesized by conventional methods.

In the examples the term "$C_4F_9$" refers to a mixture of 96 parts —$CF_2CF_2CF_2CF_3$, 2 parts —$CF_2CF(CF_3)CF_3$, 2 parts —$CF_2CF(CF_3)CF_3$, and 1-3 parts —$CF_2CF_2CF_2CF_2H$.

Perfluorobutanesulfonyl fluoride ($C_4F_9SO_2F$) was prepared by Simons Electrochemical fluorination (ECF). An early patent describing such technology is U.S. Pat. No. 2,519,953 (Simons). ECF by the Simons process is also described by S. Nagase in *Fluorine Chemistry Reviews*, vol. 1 (1), pp 77-106 (1967), and by T. Abe et al in Chapter 1 of *Preparation, Properties, and Industrial Applications of Organofluorine Compounds*, R. E. Banks, Editor, Ellis Horwood Ltd., Hoisted Press (1982).

Surface Tension

All products were diluted to the indicated concentration using deionized water. Static surface tension was measured using a Kruss K-12 tensiometer and the Du Nouy ring method at 20° C. Dynamic surface tensions were measured at the same concentration using a Sensadyne 5000 Maximum Bubble Pressure Tensiometer (available from Data Physics Instruments, Germany) at a bubble speed of 4 bubbles/second at 20° C.

Evaluation of Examples in Floor Finish

An aqueous styrene-acrylic emulsion floor finish was obtained from Cook Composites and Polymers, Kansas City, Mo., that was identical to that marketed by Cook Composites and Polymers under the trade designation "SHIELD-8"; except that the fluorinated surfactant (available under the trade designation "ZONYL FSN" from E. I. du Pont de Nemours & Co., Wilmington, Del.) (hereinafter "ZONYL") and the hydrosol emulsion leveler (available under the trade designation "ESI-CRYL 842" from Cook Composites and Polymers) were omitted. Samples of this floor finish (i.e., FF1) were prepared for testing by addition of 200 ppm of GS-1, or a comparative fluorinated surfactant used in commercial floor finishes (i.e., "FLUORAD FC-120" surfactant from 3M Company).

Five mL of the liquid floor finish, containing 200 ppm of fluorochemical surfactant was applied to the center of a 12 inch×12 inch (30.48 cm×30.48 cm) pre-cleaned black vinyl composite floor tile, then spread using a with a piece of gauze or cheesecloth covering the entire surface area of the tile until an even coating was obtained. The coating was applied using figure eight-shaped strokes covering the entire surface area of the tile until an even coating was obtained. An "X" was then made by wiping the floor finish between diagonally opposed corners of the tile. The process was repeated until a total of five layers of coating had been applied, allowing each coating layer to dry for at least 25-30 minutes prior to reapplication.

The floor tiles were coated with five courses of floor finish and the coated tiles were allowed to air dry for at least 7 days. 60° gloss was measured using a BYK-Gardner gloss meter available under the trade designation "MICRO-TRI-GLOSS METER" from Paul N. Gardner Co., Inc., Pompano Beach, Fla., as taking the average of six different measurements over the coated surface of the tile. Gloss measurements are reported in Table 1 (below). "FS-1" refers to a fluorinated surfactant obtained under the trade designation "FLUORAD FC-120" from 3M Company, Saint Paul, Minn.

Surfactant Performance in General Purpose, Waterborne Acrylic, Wood Coating Resin A waterborne wood coating resin was prepared to evaluate surfactant performance. The resin was based on Neocryl™ A-6092 all-acrylic base resin (provided by Neoresins, Wilmington Mass.). The base resin and other ingredients were formulated into WB-4041 stock solution. The WB-4041 formulation had 100 parts by weight (pbw) Neocryl™ A-6092, 20 pbw water, 1 pbw ammonium hydroxide, 1.1 pbw KP-140™ (Great Lakes Chemicals, Lafayette, Ind.), 13 pbw "CARBITOL" (available from Union Carbide, Danbury, Conn.), a 0.34 pbw COLLOID 770™ (available from Rhodia, Cranbury, N.J.).

Samples of stock solution were taken and blended with 1000 or 2,500 ppm of experimental surfactant (based on solids) for testing. The surfactant of this invention was pre-diluted to 25 wt. % in "CARBITOL" prior to adding to the aqueous starting point formulation with stirring. Comparative commercial surfactants were used as received.

Using a foam brush, an even coating of the formulation to be tested was applied to a 12 inch×12 inch (30.48 cm×30.48 cm) maple plywood panel, and allowed to dry for at least 8 hours. A total of 3 coats were applied using this procedure. The first coat was lightly sanded with 150-200 grit sandpaper. During coating the degree of foaming (between 1-5; 5=best=least amount of foam) was observed.

After the third coat was dry, the coating was evaluated for craters and pinholes (dewetting) and brush marks and striations (leveling). 60° gloss was also measured according to the procedure described above.

The panels were rated between 1 and 5 for wetting and leveling and gloss values were recorded, using the test method described above. The surface tension of the remaining resin solution was measured using a tensiometer.

Surfactant Performance in Waterborne Polycarbonate-Urethane Dispersion for use as Topcoat on Vinyl Flooring, Wood and Plastic A waterborne polycarbonate-urethane resin was prepared to evaluate surfactant performance. The base resin was Stahl's RU-40-415 formulation (obtained from Stahl, Peabody, Mass.) with the fluorinated surfactant removed. Samples of this stock resin dispersion were blended with 50 ppm of experimental surfactant (based on solids) for testing. The surfactants tested were pre-diluted to 1.0 wt. % by weight in water or a mixture of DPM and water prior to adding to the polycarbonate-urethane resin with stirring.

The same procedures used for evaluation of the waterborne acrylic wood coating resin described above were used for evaluation of the waterborne polycarbonate-urethane coating resin.

Wetting (0-5 Rating)

Wetting performance was determined by visually inspecting coating for surface defects during and after drying of the final coat. Poor wetting is generally manifested as surface defects in the form of craters, pinholes, and the coating pulling in from the edges of the tile. Wetting performance values were determined as follows:

| Observation | Rating |
| --- | --- |
| Complete de-wetting of the coating. Coating is mainly concentrated in small pools. | 0 |
| Extreme de-wetting. Only small areas of continuous coating. | 1 |

-continued

| Observation | Rating |
|---|---|
| Mainly continuous coating, however, coating has numerous craters and/or pinholes. Pronounced pulling from the edges. | 2 |
| Few but obvious craters and/or pinholes in coating | 3 |
| Very few pinholes are small craters; small lower gloss areas. | 4 |
| No observation of craters, pinholes, or coating pulling in from the edge. Wet coating remains smooth during dry down. Even gloss over entire surface. | 5 |

Leveling (0-5 Rating)

Leveling performance was also determined by visual inspection of the coating during and after drying of the final coat. Poor leveling can be determined through observation of figure eight strokes and the "X" applied during the coating process. The coating can appear uneven or have channels from application strokes. Leveling was evaluated using the following criteria:

| Observation | Rating |
|---|---|
| Deep channels or grooves in the X and figure eight pattern | 0 |
| Observation of X and all figure eight application strokes; uneven thickness of coating | 1 |
| Though the coating may appear smooth, can observe X and all 8's | 2 |
| Obvious observation of X and some figure eight patterns | 3 |
| Faint observation of X and little to no figure eight patterns | 4 |
| No observation of X or figure eights at any angle | 5 |

Preparation of N-glycidyl-N-methylperfluorobutanesulfonamide (MeFBSG)

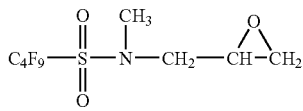

N-Methylperfluorobutanesulfonamide (MeFBSA, 313 g, 1.0 mol; preparation described in U.S. Pat. No. 6,664,354, Savu et al., Example 1, Part A) was added to a stirred mixture of 220 g NaOCH$_3$ (1.02 mol; 25% NaOMe in MeOH). The solvent was removed under vacuum (pot temperature about 80° C.; 50 mm Hg). The resulting paste was dissolved in 250 mL THF and treated with 473 g (5.11 mol) epichlorohydrin and stirred at reflux for 4 hr. GLC analysis showed complete conversion of MeFBSA. The slurry was cooled, washed with water (300 mL) and the resulting lower layer was taken up in methylene chloride, rewashed with water (300 mL), and dried over MgSO$_4$. The product was stripped and one-plate distilled to a main cut of MeFBSG as a colorless liquid (260.8 g, bp 95-105° C./0.3 mmHg).

Preparation of the Adducts (Hereinafter GS-1) from MeFBSG and Glycolic Acid

A 125 ml Pyrex tube, charged with 17.9 g MeFBSG (48.5 mmol) and 3.69 g HOCH$_2$CO$_2$H solid (48.5 mmol) and a magnetic stir bar, was sealed and heated at 120-140° C. for 4 hours. A clear solution was obtained. NMR analysis of the mixture yielded the following results:

~10% ether linked adducts (mol), C$_4$F$_9$SO$_2$NMeCH$_2$CH(OH)CH$_2$—O—(CH$_2$CO$_2$)$_b$H (b=1, 2), and ~90% ester linked adducts (mol), C$_4$F$_9$SO$_2$NMeCH$_2$CH(OH)CH$_2$—O—(C(=O)CH$_2$O)$_b$H (b=1, 2, 3)

From LC-MS analysis, the following adducts are identified:

The main compositions are C$_4$F$_9$SO$_2$NMeCH$_2$CH(OH)CH$_2$—O—(C(=O)CH$_2$O)$_b$H [b=1 (MW=445 g/mole), 2 (MW=503 g/mole), 3(MW=561 g/mole)] in ratio of about 3/2/1.

Minor compositions are C$_4$F$_9$SO$_2$NMeCH$_2$CH(OH)CH$_2$—O—(C(=O)CH$_2$O)$_b$—CH$_2$(OH)CH$_2$NMeSO$_2$C$_4$F$_9$ [b=1(MW=814 g/mole), 2 (MW=872 g/mole)].

The ratio of main composition to minor composition is about 4/1.

Table 1 shows the surface tension of water versus concentration of GS-1.

Table 2 illustrates the effect of adding GS-1 on the surface tension of resin-containing samples.

TABLE 1

| Concentration (ppm) GS-1 | Surface Tension (mN/m) |
|---|---|
| 0.000 | 72.09 |
| 12.162 | 22.17 |
| 31.313 | 21.78 |
| 61.353 | 21.66 |
| 108.198 | 21.09 |
| 180.577 | 20.63 |
| 290.833 | 19.91 |
| 455.206 | 19.37 |
| 692.555 | 18.69 |
| 1019.928 | 18.30 |
| 1444.044 | 17.91 |
| 1951.022 | 17.61 |
| 2501.885 | 17.39 |
| 4808.400 | 17.13 |

TABLE 2

| | | | Surface Tension (mN/m) | | |
|---|---|---|---|---|---|
| | | Recommended | CONTROLS | GS-1 | |
| Resin | Type | Application | No Surfactant | 0.1% | 0.3% |
| NeoCryl A-550 | Acrylic Polymer | Clear and Pigmented Coatings | 36.7 | 28.2 | 23.6 |
| NeoCryl A-6099 | Acrylic Polymer | | 39.1 | 29.2 | 21.3 |
| NeoPac R-9699 | Urethane/Acrylic Polymer | Air Dry Coatings | 48.9 | 29.1 | 23.0 |
| NeoRez R-941 | Urethane Polymer | | 43.1 | 25.5 | 19.7 |
| NeoRez R-9621 | Urethane Polymer | Industrial Laminating Adhesives | 47.4 | 33.3 | 28.2 |
| NeoCryl A-6044 | Acrylic Emulsion | | 29.2 | 26.4 | 23.4 |
| JONCRYL 537 | Acrylic Emulsion Polymer | Waterborne Coatings | 37.4 | 22.9 | 22.4 |
| JONCRYL 1532 | Acrylic Emulsion Polymer | Industrial Coatings | 38.4 | 24.8 | 20.3 |
| JONCRYL 1925 | Acrylic Emulsion | Aqueous Wood Coatings | 41.0 | 19.0 | 18.3 |

TABLE 2-continued

| | | | | Surface Tension (mN/m) | | |
|---|---|---|---|---|---|---|
| | | Recommended | CONTROLS | | GS-1 | |
| Resin | Type | Application | No Surfactant | 0.1% | 0.3% |
| JONCRYL 1972 | Self-Crosslinking Acrylic Emulsion | Coatings | 38.9 | 28.9 | 24.8 |
| CAL WEST | Poly Vinyl Alcohol | | 34.6 | 19.3 | 18.5 |
| MORGLO 2 | | Home & Commercial Care | 36.8 | 25.8 | 20.5 |
| Dura Plus 2 | | | 38.6 | 25.8 | 20.7 |
| Rhoplex B-924 | | | 38.2 | 28.1 | 22.6 |
| Megatran 240 | Acrylate Copolymer | | 34.3 | 26.1 | 21.2 |
| Water* | | | 72.0 | 17.4 | 17.4 |

*All Surfactants are tested at 0.5% for Water samples.

Preparation of the Adducts (Hereinafter GS-2) of MeFBSG and $HSCH_2CO_2H$ (SAA)

A 125 ml Pyrex tube, charged with 17.9 g MeFBSG (47.6 mmol) and 4.37 g $HSCH_2CO_2H$ solid (48.5 mmol) and a magnetic stir bar was sealed tube and heated at 120-140° C. for 4 hours. A clear solution was obtained. LC-MS analysis of the mixture confirmed the formation of the following adducts:

$C_4F_9SO_2NMeCH_2CH(OH)CH_2—SCH_2CO_2H$
(MW=461) and
$C_4F_9SO_2NMeCH_2CH(OH)CH_2—SCH_2CO_2—CH_2CH(OH)CH_2NMeSO_2C_4F_9$ (MeFBSG-SAA-MeFBSG, MW=830) in about 3/1 ratio.

In addition, a small amount of MeFBSG-$(SAA)_2$-MeFBSG was also identified with MW=904.

Preparation of the Adducts (Hereinafter GS-3) from MeFBSG and $HOCH_2CH_2CO_2H$

A 125 ml Pyrex tube, charged with 18.45 g MeFBSG (50.0 mmol) and 4.5 g $HOCH_2CH_2CO_2H$ solid (48.5 mmol), 3 drops of $CF_3SO_3H$ catalyst, and a magnetic stir bar was sealed tube and heated at 110° C. for 4 hours. A clear solution was obtained. LC-MS analysis of the mixture identified the following main adducts:

$C_4F_9SO_2NMeCH_2CH(OH)CH_2—O(CH_2CH_2CO_2)_bH$
(b=1, MW=459 g/mole; b=2, 531 g/mole) and
$C_4F_9SO2NMeCH_2CH(OH)CH_2—O(C(=O)CH_2CH_2)_aH$
(a=1, MW=459 g/mole) in about 1/1 ratio.

Table 3 illustrates the effect of adding fluorosurfactants according to the present examples and comparative examples on leveling, wetting, and 60° gloss.

TABLE 3

| Example | Fluoro-chemical | Resin | Concentration (ppm) | Leveling (0-5) | Wetting (0-5) | Gloss (60°) |
|---|---|---|---|---|---|---|
| 1 | GS-1 | Neo | 2500 | 5 | 4.5 | 62 |
| 2 | GS-2 | Neo | 2500 | 4 | 2 | 45 |
| 3 | GS-3 | Neo | 2500 | 3 | 3 | 38 |
| C-1 | FS-1 | Neo | 2500 | 3.5 | 4 | 47 |
| C-2 | ZONYL | Neo | 2500 | 5 | 5 | 58 |
| 4 | GS-1 | Neo | 1000 | 4 | 3 | 49 |
| 5 | GS-3 | Neo | 1000 | 4 | 4 | 52 |
| C-3 | ZONYL | Neo | 1000 | 3 | 3 | 41 |
| 6 | GS-1 | Spartan | 200 | 2 | 4 | N/A |
| C-4 | ZONYL | Spartan | 200 | 2 | 4 | N/A |
| 7 | GS-1 | Stahl | 50 | 5 | 3 | 64 |
| C-5 | ZONYL | Stahl | 50 | 4 | 4 | N/A |
| 8 | GS-1 | CCP-2 | 100 | 3.75 | 4 | 78 |
| C-6 | FS-1 | CCP-2 | 100 | 4.5 | 5 | 79 |
| 9 | GS-1 | CCP-2 | 200 | 3.5 | 4 | 89 |
| 10 | GS-1 | CCP-1 | 100 | 2 | 4 | 60 |
| C-7 | ZONYL | CCP-2 | 200 | 4 | 4.5 | 86 |
| C-8 | ZONYL | CCP-1 | 100 | 4 | 4 | 58 |
| 11 | GS-2 | CCP-1 | 200 | 3 | 3 | 62 |

Neo = NeoResins WB-4041
Spartan = TriLinc ™ Floor Finish
Stahl = Stahl RU-40-415
CCP-1 = B367-169
CCP-2 = B413-079

Various modifications and alterations of the invention may be made by those skilled in the art without departing from the scope and spirit of the invention, and it should be understood that this invention is not to be unduly limited to the illustrative examples.

What is claimed is:

1. A coatable composition comprising:
  a) water;
  b) a film-forming organic polymer; and
  c) a leveling agent represented by the formula:

$R_f—SO_2—N(R)—CH_2CH(OX')CH_2-Q-X$ wherein $R_f$ is selected from the group consisting of $C_2$ to $C_6$ perfluoroalkyl groups;
  R is selected from the group consisting of H and a $C_1$ to $C_{18}$ alkyl group;
  each Q is independently selected from the group consisting of O and S;
  X is selected from the group consisting of —(C(=O)—$(CH_2)_a$-Q)$_b$-M, —(($CH_2)_a$—C(=O)-Q)$_b$-M, and —(C(=O)—$(CH_2)_a$-Q)$_b$—$CH_2CH(OX')$—$CH_2N(R)SO_2R_f$;
    wherein M is selected from the group consisting of H and a cation; each a is independently selected from 1 to 5 and each b is independently selected from 1 to 4; and
  X' is selected from the group consisting of H and X.

2. A composition according to claim 1, wherein the organic polymer comprises at least one of a polymer latex or an emulsified polymer.

3. A composition according to claim 1, wherein the organic polymer is selected from an acrylic polymer, a urethane polymer, a polyvinyl alcohol, an acrylate copolymer, and combinations thereof.

4. A composition according to claim 1, wherein R is selected from a $C_1$ to $C_8$ alkyl group.

5. A composition according to claim 1, wherein R is selected from methyl, ethyl, and propyl.

6. A composition according to claim 1, further comprising a wax.

7. A composition according to claim 6, further comprising a metal complexing agent.

8. A composition according to claim 1, further comprising a crosslinking agent for the organic polymer.

9. A composition according to claim 8, wherein the crosslinking agent comprises a polyvalent metal cation selected from $Ca^{2+}$, $Mg^{2+}$, $Zn^{2+}$, $Zr^{4+}$, $Al^{3+}$, and combinations thereof.

10. A composition according to claim 1, further comprising a pigment.

11. A method of coating comprising applying to a substrate the coatable composition of claim 1.

12. A coated article comprising:
a) a substrate; and
b) the coatable composition of claim 1.

13. A composition comprising an unseparated reaction product obtained by reacting:

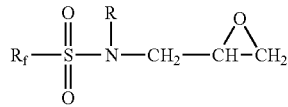

with

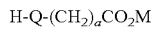

wherein $R_f$ is selected from the group consisting of $C_2$ to $C_6$ perfluoroalkyl groups;

R is selected from the group consisting of H and $C_1$ to $C_{18}$ alkyl groups;

Q is selected from the group consisting of O and S;

M is selected from the group consisting of H and a cation; and a is selected from 1 to 5.

14. A composition comprising:

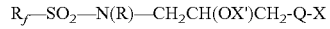

wherein $R_f$ is selected from the group consisting of $C_2$ to $C_6$ perfluoroalkyl groups;

R is selected from the group consisting of H and a $C_1$ to $C_{18}$ alkyl group;

each Q is independently selected from the group consisting of O and S;

X is selected from the group consisting of —(C(=O)—$(CH_2)_a$-Q$)_b$-M,
—(($CH_2)_a$—C(=O)-Q$)_b$-M, and —(C(=O)—$(CH_2)_a$-Q$)_b$—$CH_2CH(OX')$—$CH_2N(R)SO_2R_f$;
wherein M is selected from the group consisting of H and a cation; each a is independently selected from 1 to 5 and each b is independently selected from 1 to 4, with the proviso that when X is —(($CH_2)_a$—C(=O)-Q$)_b$-M, each b is independently selected from 2 to 4; and X' is selected from the group consisting of H and X.

15. A composition according to claim 14, wherein X is selected from the group consisting of —(C(=O)—$(CH_2)_a$-Q$)_b$-M and —(C(=O)—$(CH_2)_a$-Q$)_b$-$CH_2CH(OX')$—$CH_2N(R)SO_2R_f$.

16. A composition according to claim 15, wherein X is —(C(=O)—$(CH_2)_a$-Q$)_b$-M and b is selected from the group consisting of 1 and 2.

17. A composition according to claim 14, wherein $R_f$ is $C_4F_9$, R is $CH_3$, Q is O, X is —(C(=O)—$(CH_2)_a$-Q$)_b$-M, b is 1, and X' is H.

* * * * *

UNITED STATES PATENT AND TRADEMARK OFFICE
CERTIFICATE OF CORRECTION

PATENT NO. : 7,425,374 B2  Page 1 of 1
APPLICATION NO. : 11/275296
DATED : September 16, 2008
INVENTOR(S) : Zai-Ming Qiu It is certified that error appears in the above-identified patent and that said Letters Patent is hereby corrected as shown below:

Column 3
Line 2, under (SCHEME I), delete "Rf" and insert -- $R_f$ --, therefor.
Line 64, delete "$R_f$," and insert -- $R_f$. --, therefor.

Column 4
Line 2, under (SCHEME I), delete "Rf" and insert -- $R_f$ --, therefor.

Column 5
Line 2, under (SCHEME II), delete "Rf" and insert -- $R_f$ --, therefor.
Line 2, under (SCHEME II), after "$H^+$" delete "Rf" and insert -- $R_f$ --, therefor.
Line 4, under (SCHEME II), delete "Rf" and insert -- $R_f$ --, therefor.

Column 8
Line 1, delete "Waterborne" and insert -- Waterborne, --, therefor.

Column 10
Line 18, after "(b=1, 2, 3)" insert -- . --.

Column 11
Line 43, delete "C4F9SO2NMeCH2" and insert -- $C_4F_9SO_2NMeCH_2$ --, therefor.

Signed and Sealed this

Twenty-third Day of December, 2008

JON W. DUDAS
*Director of the United States Patent and Trademark Office*